US010938418B2

(12) United States Patent
Hendrickson et al.

(10) Patent No.: US 10,938,418 B2
(45) Date of Patent: Mar. 2, 2021

(54) ONLINE DISK REPLACEMENT/REMOVAL

(71) Applicant: International Business Machines Corporation, Armonk, NY (US)

(72) Inventors: Dustin M. Hendrickson, Biggsville, IL (US); Manish Motwani, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 30 days.

(21) Appl. No.: 15/362,180

(22) Filed: Nov. 28, 2016

(65) Prior Publication Data
US 2017/0075762 A1 Mar. 16, 2017

Related U.S. Application Data

(63) Continuation-in-part of application No. 14/458,969, filed on Aug. 13, 2014, now Pat. No. 9,632,722, (Continued)

(51) Int. Cl.
*G06F 12/00* (2006.01)
*H03M 13/15* (2006.01)
(Continued)

(52) U.S. Cl.
CPC ........ *H03M 13/1515* (2013.01); *G06F 3/067* (2013.01); *G06F 3/0608* (2013.01);
(Continued)

(58) Field of Classification Search
CPC .. G06F 3/067; G06F 11/1076; G06F 11/1092; G06F 11/2094; G06F 11/08; G06F 15/17331; G06F 3/0689; G06F 21/64
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

David A. Patterson, Garth Gibson, and Randy H. Katz. 1988. A case for redundant arrays of inexpensive disks (RAID). In Proceedings of the 1988 ACM SIGMOD international conference on Management of data (SIGMOD '88), Haran Boral and Per-Ake Larson (Eds.). ACM, New York, NY, USA, 109-116. (Year: 1988).*
(Continued)

*Primary Examiner* — Prasith Thammavong
(74) *Attorney, Agent, or Firm* — Garlick & Markison; Kelly H. Hale

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device detects a failed memory device (e.g., of a storage unit (SU) that stores at least one encoded data slice (EDS). The computing device then determines a DSN address range associated with at least some EDSs associated with a data object stored within the failed memory device and transmits the DSN address range to another computing device within the DSN to instruct restriction within the DSN of a memory access request for an EDSs associated with the data object that is stored within the failed memory device.

20 Claims, 5 Drawing Sheets

Related U.S. Application Data which is a continuation-in-part of application No. 13/097,305, filed on Apr. 29, 2011, now Pat. No. 9,026,758, which is a continuation-in-part of application No. 12/218,594, filed on Jul. 16, 2008, now Pat. No. 7,962,641, which is a continuation-in-part of application No. 12/218,200, filed on Jul. 14, 2008, now Pat. No. 8,209,363, and a continuation-in-part of application No. 12/080,042, filed on Mar. 31, 2008, now Pat. No. 8,880,799, and a continuation-in-part of application No. 11/973,613, filed on Oct. 9, 2007, now Pat. No. 8,285,878, and a continuation-in-part of application No. 11/973,621, filed on Oct. 9, 2007, now Pat. No. 7,904,475, and a continuation-in-part of application No. 11/973,622, filed on Oct. 9, 2007, now Pat. No. 8,171,101, and a continuation-in-part of application No. 11/973,542, filed on Oct. 9, 2007, now Pat. No. 9,996,413, and a continuation-in-part of application No. 11/403,684, filed on Apr. 13, 2006, now Pat. No. 7,574,570, and a continuation-in-part of application No. 11/403,391, filed on Apr. 13, 2006, now Pat. No. 7,546,427, and a continuation-in-part of application No. 11/404,071, filed on Apr. 13, 2006, now Pat. No. 7,574,579, and a continuation-in-part of application No. 11/241,555, filed on Sep. 30, 2005, now Pat. No. 7,953,937.

(60) Provisional application No. 61/346,173, filed on May 19, 2010.

(51) Int. Cl.

| | | |
|---|---|---|
| *G06F 3/06* | (2006.01) | |
| *G06F 11/20* | (2006.01) | |
| *H04L 9/08* | (2006.01) | |
| *G06F 11/10* | (2006.01) | |
| *H04L 29/08* | (2006.01) | |
| *H04L 29/14* | (2006.01) | |

(52) U.S. Cl.
CPC .......... *G06F 3/0619* (2013.01); *G06F 3/0644* (2013.01); *G06F 3/0652* (2013.01); *G06F 3/0659* (2013.01); *G06F 11/1092* (2013.01); *G06F 11/2094* (2013.01); *H04L 9/085* (2013.01); *H04L 9/0894* (2013.01); *H04L 67/22* (2013.01); *H04L 69/40* (2013.01); *G06F 2201/805* (2013.01); *G06F 2211/1028* (2013.01); *H04L 2209/34* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,061,750 | A * | 5/2000 | Beardsley .......... G06F 11/2092 710/10 |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,243,984 | B1 * | 8/2012 | Brown .................. G06Q 30/06 348/143 |
| 8,874,868 | B2 * | 10/2014 | Baptist ................... H04L 9/085 711/165 |
| 10,361,813 | B2 * | 7/2019 | Leggette ............... H04L 1/0041 |
| 10,365,968 | B2 * | 7/2019 | Motwani ................ G06F 3/067 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2005/0273686 | A1 * | 12/2005 | Turner ................ G06F 11/1076 714/752 |
| 2006/0047907 | A1 | 3/2006 | Shiga et al. |
| 2006/0107101 | A1 * | 5/2006 | Soeda .................. G06F 11/1076 714/6.2 |
| 2006/0136448 | A1 | 6/2006 | Cialini et al. |
| 2006/0156059 | A1 | 7/2006 | Kitamura |
| 2006/0206752 | A1 * | 9/2006 | Ikeuchi ............... G06F 11/1076 714/6.22 |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0117351 | A1 * | 5/2012 | Motwani ............. H04L 63/0823 711/165 |
| 2014/0068259 | A1 * | 3/2014 | Resch .................. H04L 9/0861 713/167 |
| 2015/0381731 | A1 * | 12/2015 | Grube .................. H04L 67/325 709/224 |

(56) References Cited

U.S. PATENT DOCUMENTS

2017/0075762 A1* 3/2017 Hendrickson ..... H03M 13/1515
2018/0089020 A1* 3/2018 Khadiwala ................ H04L 1/00
2018/0364940 A1* 12/2018 Motwani ............... G06F 3/0619

OTHER PUBLICATIONS

James S. Plank. 1997. A tutorial on Reed-Solomon coding for fault-tolerance in RAID-like systems. Softw. Pract. Exper. 27, 9 (Sep. 1997), 995-1012. (Year: 1997).*
Shamir; How to Share a Secret; Communications of the ACM; vol. 22, No. 11; Nov. 1979; pp. 612-613.
Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

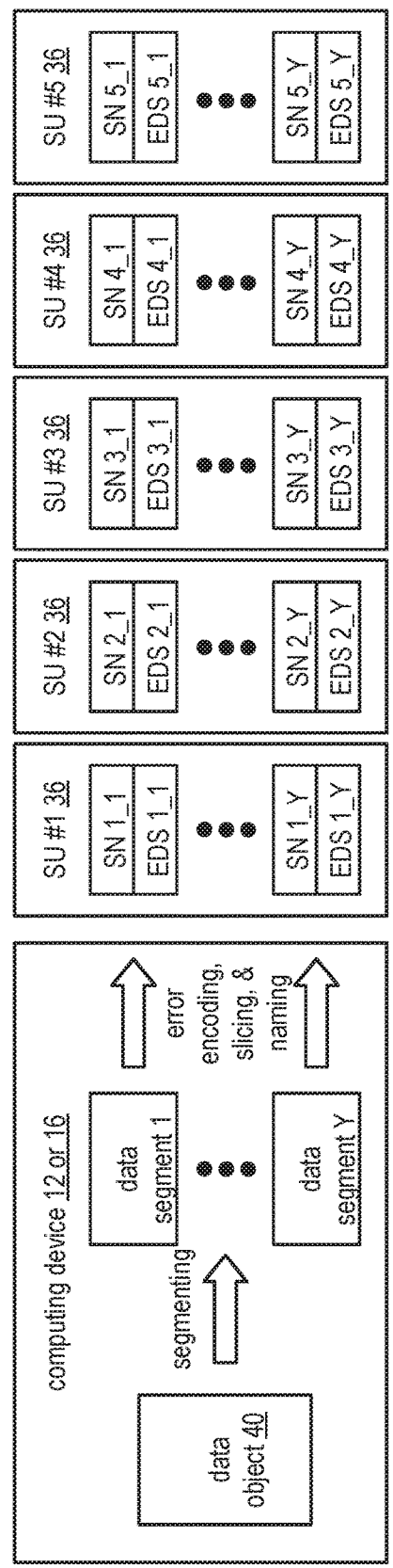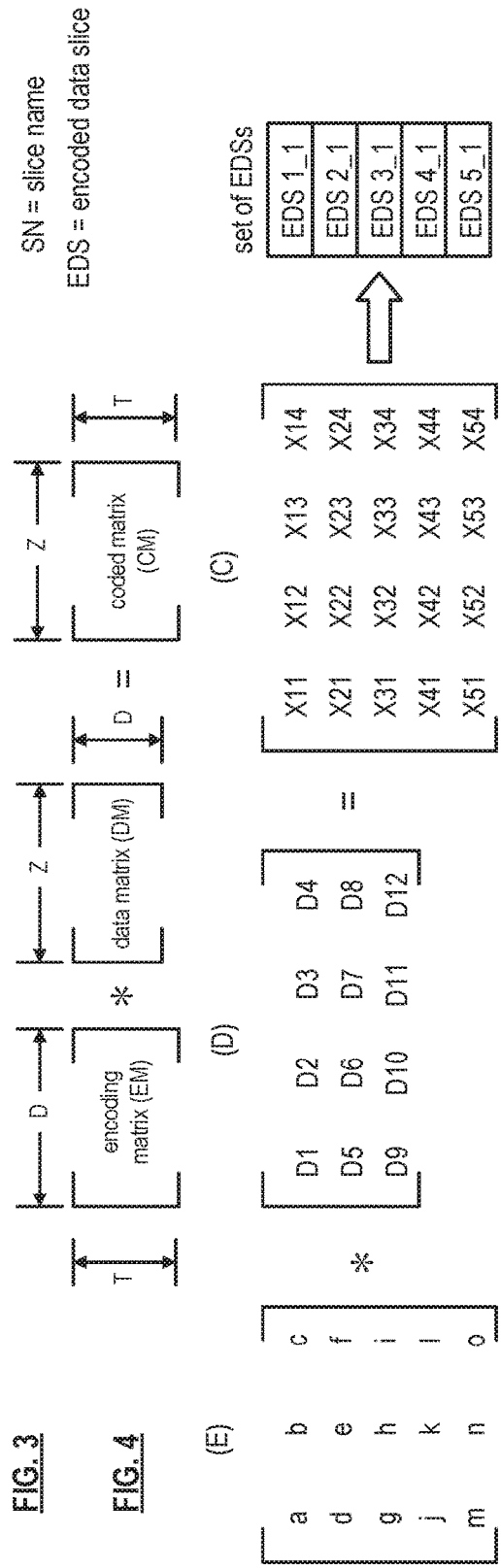
FIG. 3
FIG. 4
FIG. 5
FIG. 6

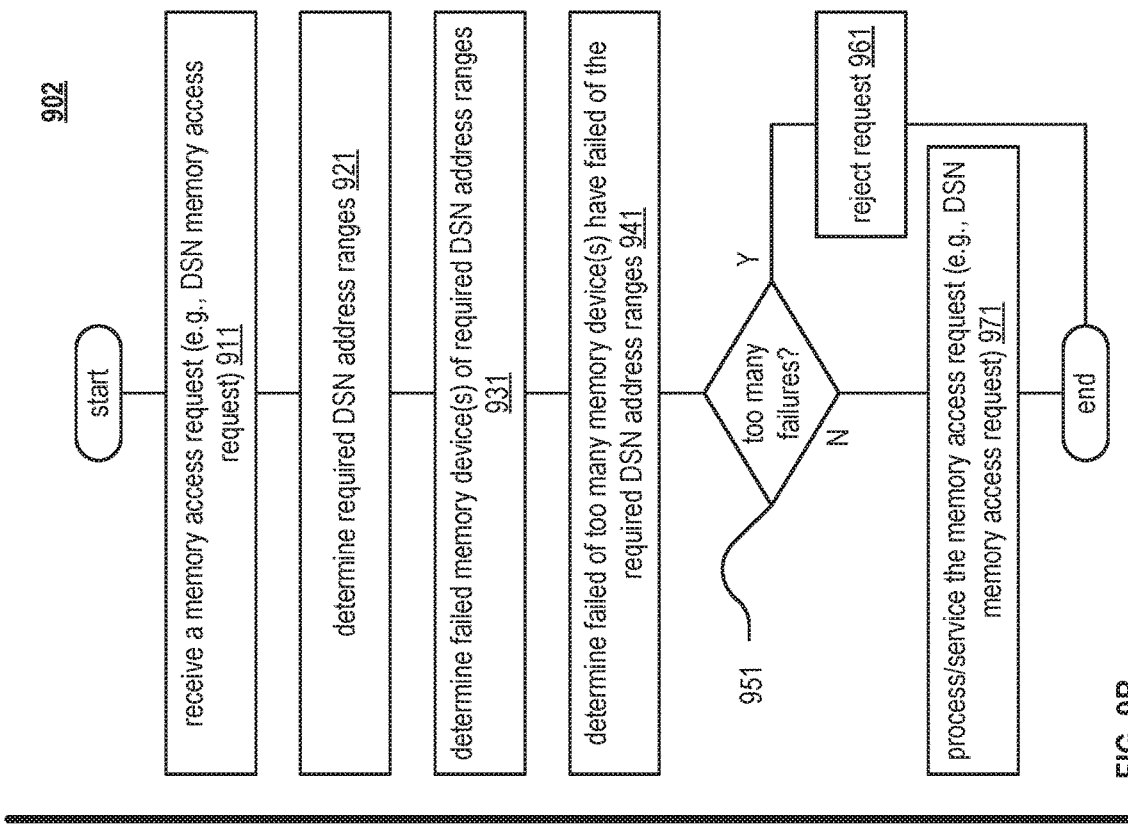

ONLINE DISK REPLACEMENT/REMOVAL

CROSS REFERENCE TO RELATED PATENTS

The present U.S. Utility patent application also claims priority pursuant to 35 U.S.C. § 120, as a continuation-in-part (CIP) of U.S. Utility patent application Ser. No. 14/458,969, entitled "BALANCING STORAGE UNIT UTILIZATION WITHIN A DISPERSED STORAGE NETWORK," filed Aug. 13, 2014 pending, which claims priority pursuant to 35 U.S.C. § 120, as a continuation-in-part (CIP) of U.S. Utility patent application Ser. No. 13/097,305, entitled "MEMORY DEVICE UTILIZATION IN A DISPERSED STORAGE NETWORK," filed Apr. 29, 2011, now issued as U.S. Pat. No. 9,026,758 on May 5, 2015, which claims priority pursuant to 35 U.S.C. § 119(e) to U.S. Provisional Application No. 61/346,173, entitled "SECURELY STORING DATA IN DISPERSED STORAGE NETWORK," filed May 19, 2010, all of the above-referenced patent applications and patents are hereby incorporated herein by reference in their entirety and made part of the present U.S. Utility patent application for all purposes.

The U.S. Utility patent application Ser. No. 13/097,305 is also a continuation-in-part (CIP) of U.S. Utility patent application Ser. No. 12/218,594, entitled "STREAMING MEDIA SOFTWARE INTERFACE TO A DISPERSED DATA STORAGE NETWORK," filed on Jul. 16, 2008, now issued as U.S. Pat. No. 7,962,641 on Jun. 14, 2011, which is a continuation-in-part (CIP) of U.S. Utility patent application Ser. No. 11/973,613, entitled "BLOCK BASED ACCESS TO A DISPERSED DATA STORAGE NETWORK," filed on Oct. 9, 2007, now issued as U.S. Pat. No. 8,285,878 on Oct. 9, 2012, and a continuation-in-part (CIP) of U.S. Utility patent application Ser. No. 11/973,622, filed on Oct. 9, 2007, entitled "SMART ACCESS TO A DISPERSED DATA STORAGE NETWORK," now issued as U.S. Pat. No. 8,171,101 on May 1, 2012, and a continuation-in-part (CIP) of U.S. Utility patent application Ser. No. 11/973,542, filed on Oct. 9, 2007, entitled "ENSURING DATA INTEGRITY ON A DISPERSED STORAGE GRID," and a continuation-in-part (CIP) of U.S. Utility patent application Ser. No. 11/973,621, filed on Oct. 9, 2007, entitled "VIRTUALIZED DATA STORAGE VAULTS ON A DISPERSED DATA STORAGE NETWORK," now issued as U.S. Pat. No. 7,904,475 on Mar. 8, 2011, and a continuation-in-part (CIP) of U.S. Utility patent application Ser. No. 11/241,555, filed on Sep. 30, 2005, entitled "SYSTEMS, METHODS, AND APPARATUS FOR SUBDIVIDING DATA FOR STORAGE IN A DISPERSED DATA STORAGE GRID," now issued as U.S. Pat. No. 7,953,937 on May 31, 2011, and a continuation-in-part (CIP) of U.S. Utility patent application Ser. No. 11/403,684, entitled "BILLING SYSTEM FOR INFORMATION DISPERSAL SYSTEM," filed on Apr. 13, 2006, now issued as U.S. Pat. No. 7,574,570 on Aug. 11, 2009, and a continuation-in-part (CIP) of U.S. Utility patent application Ser. No. 11/404,071, entitled "METADATA MANAGEMENT SYSTEM FOR AN INFORMATION DISPERSED STORAGE SYSTEM," filed on Apr. 13, 2006, now issued as U.S. Pat. No. 7,574,579 on Aug. 11, 2009, and a continuation-in-part (CIP) of U.S. Utility patent application Ser. No. 11/403,391, entitled "SYSTEM FOR REBUILDING DISPERSED DATA," filed on Apr. 13, 2006, now issued as U.S. Pat. No. 7,546,427 on Jun. 9, 2009, and a continuation-in-part (CIP) of U.S. Utility patent application Ser. No. 12/080,042, entitled "REBUILDING DATA ON A DISPERSED STORAGE NETWORK," filed on Mar. 31, 2008, now issued as U.S. Pat. No. 8,880,799 on Nov. 4, 2014, and a continuation-in-part (CIP) of U.S. Utility patent application Ser. No. 12/218,200, entitled "FILE SYSTEM ADAPTED FOR USE WITH A DISPERSED DATA STORAGE NETWORK," filed on Jul. 14, 2008, now issued as U.S. Pat. No. 8,209,363 on Jun. 26, 2012, all of the above-referenced patent applications and patents are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

One data storage solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9A is a flowchart illustrating the detection of a failed memory device by a DS processing module in accordance with the present invention; and FIG. 9B is a flowchart illustrating the processing of a memory access request by a DS processing module where consideration is given to the DSN address ranges of failed memory devices in accordance with the present invention.

DETAILED DESCRIPTION OF THE INVENTION

Figure 1:
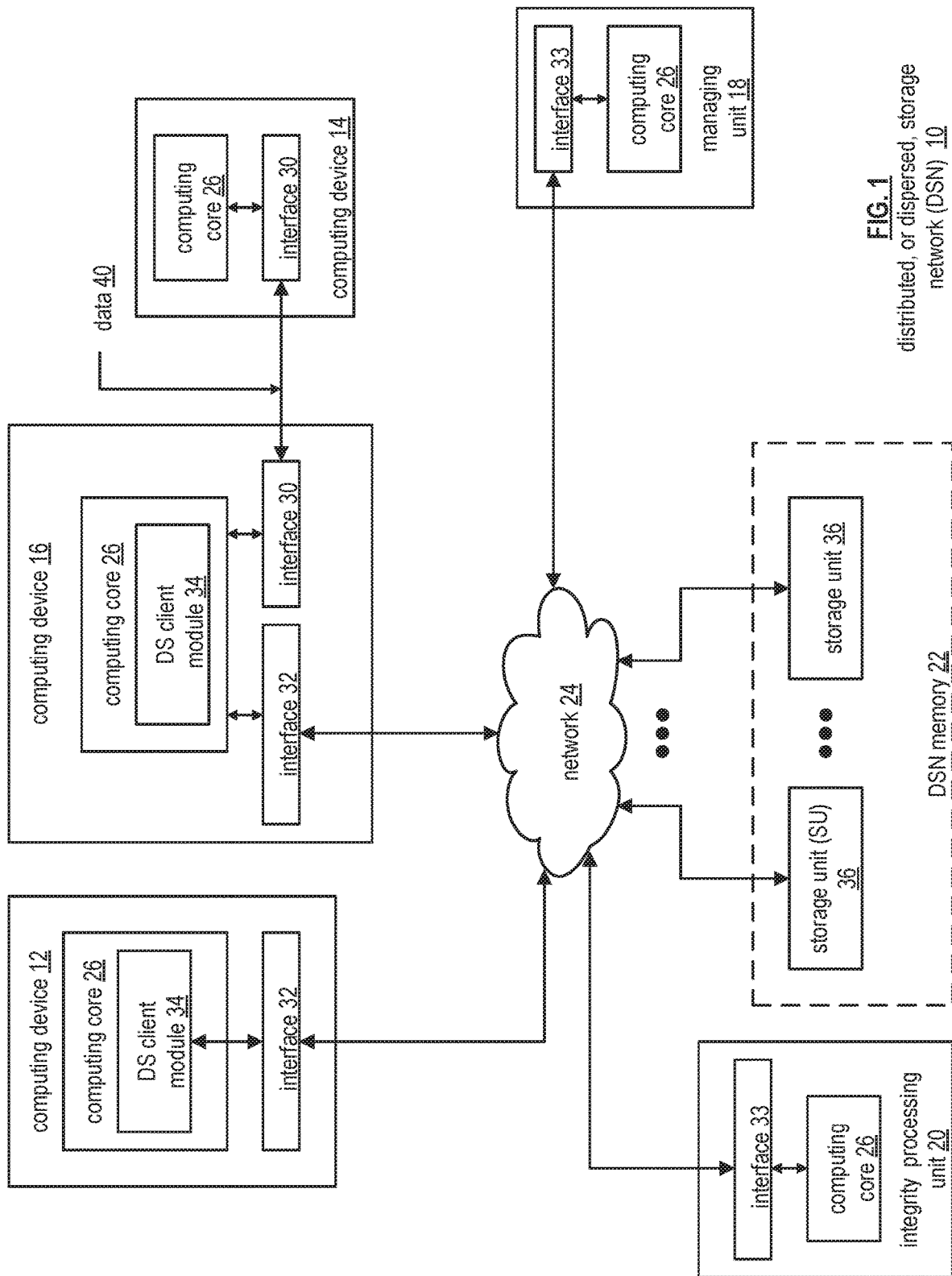
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
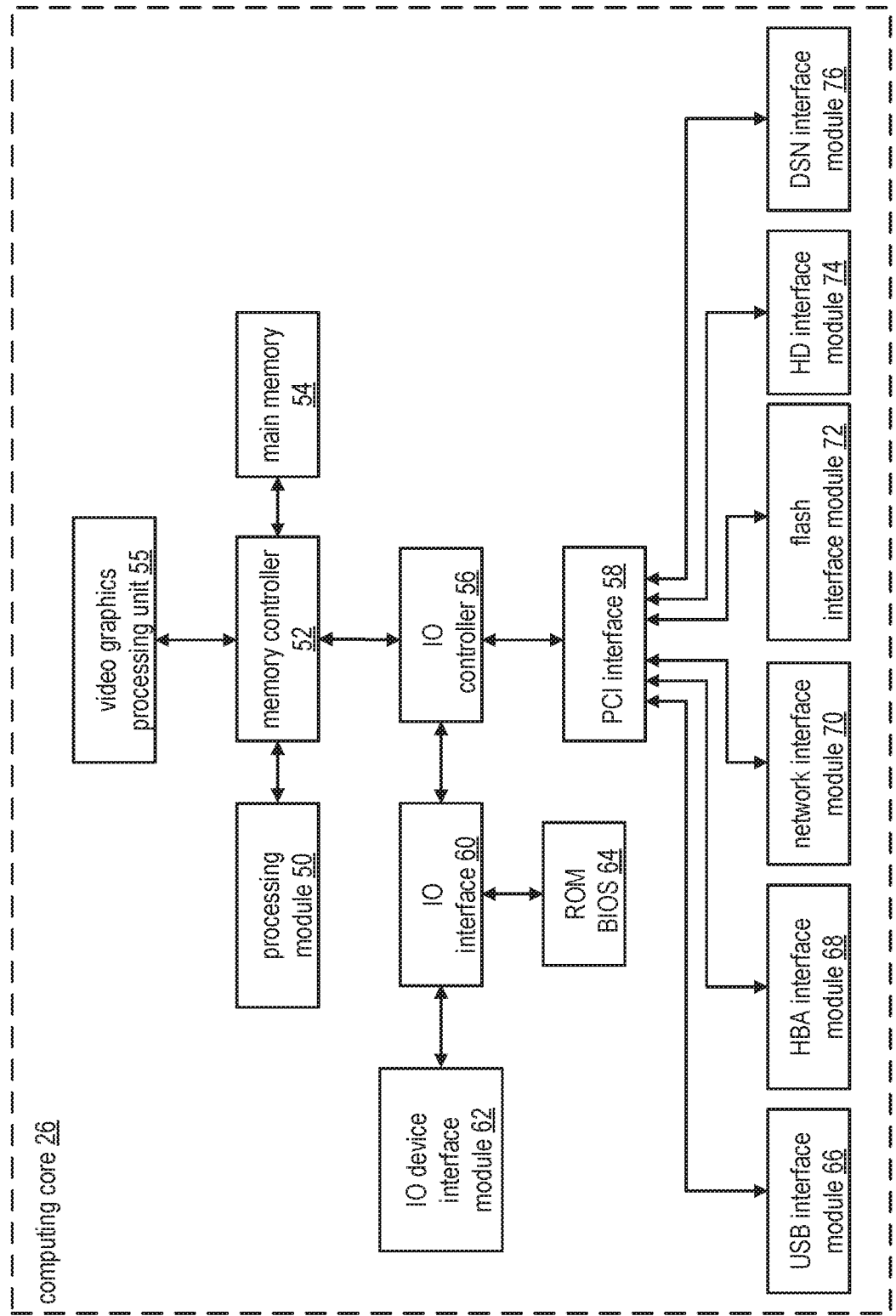
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22. In some examples, the slice name includes universal DSN memory addressing routing information (e.g., virtual memory addresses in the DSN memory 22) and user-specific information (e.g., user ID, file name, data block identifier, etc.).

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
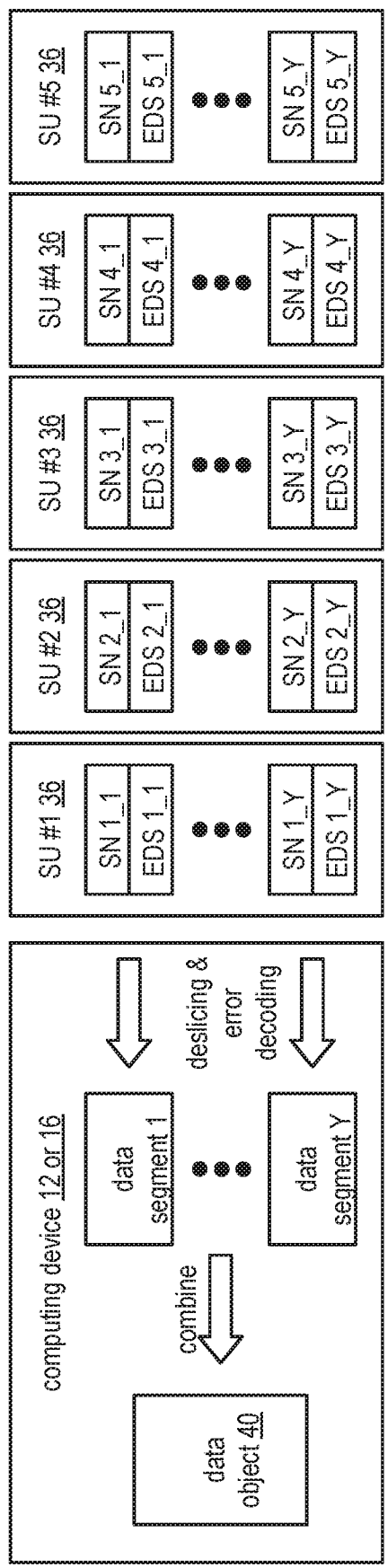
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
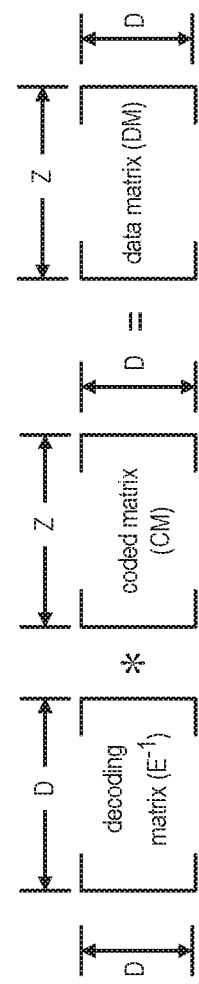
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9A is a flowchart illustrating the detection of a failed memory device by a DS processing module in accordance with the present invention. From certain perspectives, method 901 corresponds to a DS processing module method (e.g., DS unit) to report an unavailable DSN address range based on a memory device failure. The DS processing module may be implemented in any one or more of a user device, a DS processing unit, the DS managing unit, the storage integrity processing unit, and/or a DS unit. In an embodiment, the DS processing module is implemented in the DS unit. The method 901 begins with the step 910 where the DS processing module detects a failed memory device. The determination may be based on one or more of but not limited to a query, and the error message, a failed transaction indicator, a memory device removal indicator, a message, and/or a command.

Examples of a failed memory device may be varied in various examples, implementations, and embodiments. Examples of failure of memory device may include failure of any one or more of a SU (e.g., categorizing an entire SU as failed, categorizing multiple SUs as failed, etc.), a part of a SU (e.g., a memory device basis within an SU such as failure of one or more individual memory devices within a SU that includes multiple memory devices), and/or a hard disk drive (HDD) of a SU (e.g., failure of one or more individual HDDs within a SU that includes multiple HDDs), etc. In general, failure of a memory device may correspond to failure of different components based on different granularity within the DSN in various examples, implementations, and embodiments. In one example, detection of a failed memory device corresponds to detection of an entire SU that is failed. In another example, detection of a failed memory device corresponds to detection of a failed individual memory device of a number of provisioned memory devices in an SU. In another example, detection of a failed memory device corresponds to detection of more than one failed memory device of a number of provisioned memory devices in an SU. In another specific example, detection of a failed memory device corresponds to detection of a failed HDD of a number of provisioned HDDs in an SU. In yet another specific example, detection of a failed memory device corresponds to detection of more than one failed HDD of a number of provisioned HDDs in an SU. Note that any desired degree of granularity of one or more failure of memory devices may be used in various examples, implementations, and embodiments.

The method 901 continues with the step 920 where the DS processing module determines the DSN address range of the failed memory device. Note that this involves the DSN address range of the failed component(s) that have been identified or detected as the memory device (e.g., one memory device, multiple memory devices, one HDD, multiple HDDs, one SU, multiple SUs, and/or any other specificity or granularity of failed devices that are detected). In some examples, note that while a portion of a SU (e.g., a memory device therein, a HDD therein, etc.) may be detected as being a failed memory device, other portions of that same SU may operate and function properly.

In some examples, the DS processing module determines the range of DSN addresses corresponding to the data slices that were assigned to the failed memory device. The determination may be based on one or more of but not limited to a virtual DSN address to physical location table lookup, a query, a message, and/or a command. The method 910 continues with the step 930 where the DS processing module sends the DSN address range of the failed memory device to one or more of a DS processing unit, a DS managing unit, a storage integrity processing unit, a user device, and/or a DS unit. Note that this detection and alerting sequence may invoke memory device access restrictions by a DS processing module method as described in greater detail with reference to FIG. 9B below.

In an example of operation and implementation, a computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations.

In an example, the processing module, when operable within the computing device based on the operational instructions, is configured to detect a failed memory device of a storage unit (SU) of a plurality of SUs that distributedly stores a set of encoded data slices (EDSs). Note that a data object is segmented into a plurality of data segments, a data segment of the plurality of data segments is dispersed error encoded in accordance with dispersed error encoding parameters to produce the set of EDSs, and a decode threshold number of EDSs are needed to recover the data segment. In addition, note that a read threshold number of EDSs provides for reconstruction of the data segment, and a write threshold number of EDSs provides for a successful transfer of the set of EDSs from a first at least one location in the DSN to a second at least one location in the DSN. The processing module is then configured to determine a DSN address range associated with at least some EDSs of the set of EDSs associated with the data object that are stored within the failed memory device of a SU of the plurality of SUs. The processing module is then configured to transmit the DSN address range to another computing device within the DSN to instruct restriction within the DSN of a memory access request associated with the at least some EDSs associated with the data object that are stored within the failed memory device of the SU of the plurality of SUs.

Note that the memory access request may be implemented to include a user identifier (ID), a data object name, a priority indicator, a security indicator, a performance indicator, access requirements, metadata, and/or an access command. The access command may include a store command, a retrieve command, a delete command, and/or a list command.

In some examples, the processing module is further configured to determine the DSN address range associated with the at least some EDSs of the set of EDSs associated with the data object that are stored within the failed memory device of the SU of the plurality of SUs based on at least one of a data object name, a user identifier (ID), a vault lookup, a virtual DSN address to physical location table lookup, a source name determination, a slice name determination, a predetermination, a message, a command, and/or a virtual DSN address to physical location table lookup utilizing a plurality of slice names as an index.

In even other examples, the processing module is further configured to service the DSN of memory access request based on the decode threshold number of EDSs, the read threshold number of EDSs, and/or the write threshold number of EDSs of the set of EDSs from other SUs of the plurality of SUs excluding the failed memory device of the SU of the plurality of SUs.

Note that the computing device may be located at a first premises that is remotely located from at least one SU of the primary SUs or plurality of secondary SUs the within the DSN. Also, note that the computing device may be of any of a variety of types of devices as described herein and/or their equivalents including a SU of the primary SUs or the secondary SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

FIG. 9B is a flowchart illustrating the processing of a memory access request by a DS processing module where consideration is given to the DSN address ranges of failed memory devices in accordance with the present invention. The DS processing module may be implemented in any one or more of a user device, a DS processing unit, the DS managing unit, the storage integrity processing unit, and/or a DS unit.

In an embodiment, the DS processing module is implemented in the DS processing unit. The method 902 begins with the step 911 where the DS processing module receives a DSN memory access request. The request may include one or more of but not limited to a user ID, a data object name, a priority indicator, a security indicator, a performance indicator, access requirements, metadata, and/or an access command. Note that the access command may include one of but not limited to a store command, a retrieve command, a delete command, and/or a list command.

The method 902 continues with the step 921 where the DS processing module determines require DSN address ranges for a plurality of slices of a plurality of data segments related to the DSN memory access request. The determination may be based on one or more of but not limited to a data object name, a user ID, a vault lookup, a virtual DSN address to physical location table lookup, a source name determination, a slice name determination, a predetermination, a message, and/or a command. For example, the DS processing module determines the source name based on the data object name in the vault ID. The DS processing module may determine a plurality of slice names for the source name. The DS processing module may determine the require DSN address ranges based on a virtual DSN address to physical location table lookup utilizing the plurality of slice names as an index.

The method 902 continues with the step 931 where the DS processing module determines failed memory devices of the require DSN address ranges. The determination may be based on one or more of but not limited to a failed address range list, a received DSN address range of a failed memory device from a DS unit, a query, a message, and/or a command. For example, the DS processing module receives one or more messages from one or more DS units that indicate the DSN address range of one or more failed memory devices. The DS processing module aggregates the messages into the failed address range list and utilizes the list to determine the failed memory devices of the require DSN address ranges by comparing the addresses of a list to the require DSN address ranges.

The method 902 continues with the step 941 where the DS processing module determines if too many memory devices have failed of the require DSN address ranges by comparing the number of failed memory devices of the require DSN address ranges to a failure threshold. The DS processing module determines that too many memory devices have failed of the required DSN address ranges when the number of failed memory devices of the required DS address ranges is greater than the failure threshold. The method 902 ends with the step where the DS processing module rejects the DSN memory access request in step 961 when the DS processing module determines that too many memory devices have failed all of the required DSN address ranges from step 951. The DS processing module may reject the request by sending a reject message to the requester and/or the DS managing unit. Alternatively, the method 902 ends with the step 971 where the DS processing module processes the DSN memory access request when the DS processing module determines that too many memory devices have not failed of the require DSN address range from step 951. Note that a computing system network utilization efficiency improvement may be provided by the above method since data slice retrievals will not be attempted when there are too many memory device failures.

In another example of operation and implementation, a computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations.

In another example, the processing module, when operable within the computing device based on the operational instructions, is configured to receive a memory access request for a data object stored within the DSN. Note that the data object is segmented into a plurality of data segments, wherein a data segment of the plurality of data segments is dispersed error encoded in accordance with dispersed error encoding parameters to produce a set of EDSs. The set of EDSs are distributedly stored among a plurality of storage units (SUs), and a decode threshold number of EDSs are needed to recover the data segment. The processing module is further configured to determine a DSN address range associated with the set of EDSs associated with the data object. Then, the processing module is further configured to determine at least one failed memory device of a SU of the plurality of SUs that stores at least one EDS of the set of EDSs within the DSN address range and to determine whether at least the decode threshold number of EDSs are stored within the at least one failed memory device of the SU of the plurality of SUs.

When it is determined that the at least the decode threshold number of EDSs are stored within the at least one failed memory device of the SU of the plurality of SUs, the processing module is further configured to reject the memory access request for the data object stored within the DSN.

Alternatively, when it is determined that the at least the decode threshold number the at least the decode threshold number of EDSs are not stored within the at least one failed memory device of the SU of the plurality of SUs, the processing module is further configured to service the memory access request for the data object stored within the DSN.

In some examples, the memory access request includes a user identifier (ID), a data object name, a priority indicator, a security indicator, a performance indicator, access requirements, metadata, and/or an access command. The access command may include a store command, a retrieve command, a delete command, and/or a list command.

In some examples, the processing module is further configured to determine the DSN address range associated with the set of EDSs associated with the data object based on at least one of a data object name, a user identifier (ID), a vault lookup, a virtual DSN address to physical location table lookup, a source name determination, a slice name determination, a predetermination, a message, a command, or a virtual DSN address to physical location table lookup utilizing a plurality of slice names as an index.

Note that the computing device may be located at a first premises that is remotely located from at least one SU of the primary SUs or plurality of secondary SUs the within the DSN. Also, note that the computing device may be of any of a variety of types of devices as described herein and/or their equivalents including a SU of the primary SUs or the secondary SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

Within some storage systems, there may be a desire to replace a memory device from a SU from a set of SUs or a storage pool of SUs, etc. (e.g., for replacement, servicing, or other purposes) without having to bring down the slice-server software. This greatly increases system availability, as before, every memory device failure (e.g., an individual memory device failure, a disk failure such as an HDD failure, and/or any other device failure within a portion of such a SU, etc.) would cause the machine to be down for some amount of time, and SUs with a large number of memory devices (e.g., disks, HDDs, etc.) were particularly impacted by this limitation. The SU can now recognize whether the original memory device (e.g., disk, HDD, and/or other component within a SU, etc.), or a new memory device (e.g., disk, HDD, and/or other component within a SU, etc.) was inserted, and if a new memory device (e.g., disk, HDD, and/or other component within a SU, etc.) is inserted, trigger a reformat and rebuild of data. Note that the ability to remain online and functioning with a memory device removal memory device may be viewed as being different from memory device removal/replacement in RAID arrays, because in a RAID array, all the necessary data exists to read everything that was stored due to the additional redundancy. However, within a SU, there may be no redundancy across the one or more memory devices implemented therein (e.g., disks, HDDs, and/or other component memory device such as a disk, HDD, and/or other component within one or more SUs, etc. within a SU, etc.). This disclosure presents, among other things, various examples and embodiments of computing devices that operate based on intelligence so as to recognize the range impacted by the loss of the memory device (e.g., such as a portion of a SU, etc.), and automatically fail without attempting any reads or writes that apply to that range.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc.

that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed storage network (DSN);
   memory that stores operational instructions; and
   a processing module operably coupled to the interface and to the memory, wherein the processing module, when operable within the computing device based on the operational instructions, is configured to:
   detect a failed memory device among a plurality of memory devices of a storage unit (SU) of a plurality of SUs that distributedly stores a set of encoded data slices (EDSs), wherein a data object is segmented into a plurality of data segments, wherein a data segment of the plurality of data segments is dispersed error encoded in accordance with dispersed error encoding parameters to produce the set of EDSs, wherein a decode threshold number of EDSs are needed to recover the data segment;
   determine a DSN address range associated with at least some EDSs of the set of EDSs associated with the data object that are stored within the failed memory device among the plurality of memory devices of the SU of the plurality of SUs; and
   transmit the DSN address range to another computing device within the DSN to instruct restriction within the DSN of a memory access request associated with the at least some EDSs associated with the data object that are stored within the failed memory device among the plurality of memory devices of the SU of the plurality of SUs.

2. The computing device of claim 1, wherein the memory access request includes at least one of:
   a user identifier (ID), a data object name, a priority indicator, a security indicator, a performance indicator, access requirements, metadata, or an access command.

3. The computing device of claim 2, wherein, when the memory access request includes the access command, the access command includes at least one of:
   a store command, a retrieve command, a delete command, or a list command.

4. The computing device of claim 1, wherein the processing module, when operable within the computing device based on the operational instructions, is further configured to:
   determine the DSN address range associated with the at least some EDSs of the at the set of EDSs associated with the data object that are stored within the failed memory device among the plurality of memory devices of the SU of the plurality of SUs based on at least one of a data object name, a user identifier (ID), a vault lookup, a virtual DSN address to physical location table lookup, a source name determination, a slice name determination, a predetermination, a message, a command, or a virtual DSN address to physical location table lookup utilizing a plurality of slice names as an index.

5. The computing device of claim 1, wherein the processing module, when operable within the computing device based on the operational instructions, is further configured to:
   service the DSN of memory access request based on at least one of the decode threshold number of EDSs, a read threshold number of EDSs, or a write threshold number of EDSs of the set of EDSs from other SUs of the plurality of SUs excluding the failed memory device among the plurality of memory devices of the SU of the plurality of SUs, wherein the read threshold number of EDSs provides for reconstruction of the data segment, and wherein the write threshold number of EDSs provides for a successful transfer of the set of EDSs from a first at least one location in the DSN to a second at least one location in the DSN.

6. The computing device of claim 1, wherein the computing device is located at a first premises that is remotely located from at least one SU of the plurality of SUs within the DSN.

7. The computing device of claim 1 further comprising:
   a SU of the plurality of SUs within the DSN, a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:
   an interface configured to interface and communicate with a dispersed storage network (DSN);
   memory that stores operational instructions; and a processing module operably coupled to the interface and to the memory, wherein the processing module, when operable within the computing device based on the operational instructions, is configured to:

receive a memory access request for a data object stored within the DSN, wherein the data object is segmented into a plurality of data segments, wherein a data segment of the plurality of data segments is dispersed error encoded in accordance with dispersed error encoding parameters to produce a set of EDSs, wherein the set of EDSs are distributedly stored among a plurality of storage units (SUs), wherein a decode threshold number of EDSs are needed to recover the data segment;

determine a DSN address range associated with the set of EDSs associated with the data object;

determine a failed memory device among a plurality of memory devices of a storage unit (SU) of the plurality of SUs that stores at least one EDS of the set of EDSs within the DSN address range;

determine whether at least the decode threshold number of EDSs are stored within the failed memory device among the plurality of memory devices of the SU of the plurality of SUs;

when it is determined that the at least the decode threshold number of EDSs are stored within the memory device of the SU of the plurality of SUs, reject the memory access request for the data object stored within the DSN; and when it is determined that the at least the decode threshold number the at least the decode threshold number of EDSs are not stored within the failed memory device among the plurality of memory devices of the SU of the plurality of SUs, service the memory access request for the data object stored within the DSN.

10. The computing device of claim 9, wherein the memory access request includes at least one of:
a user identifier (ID), a data object name, a priority indicator, a security indicator, a performance indicator, access requirements, metadata, or an access command.

11. The computing device of claim 10, wherein, when the memory access request includes the access command, the access command includes at least one of:
a store command, a retrieve command, a delete command, or a list command.

12. The computing device of claim 9, wherein the processing module, when operable within the computing device based on the operational instructions, is further configured to:
determine the DSN address range associated with the set of EDSs associated with the data object based on at least one of a data object name, a user identifier (ID), a vault lookup, a virtual DSN address to physical location table lookup, a source name determination, a slice name determination, a predetermination, a message, a command, or a virtual DSN address to physical location table lookup utilizing a plurality of slice names as an index.

13. The computing device of claim 9 further comprising:
a SU of the plurality of SUs within the DSN, a wireless smart phone, a laptop, a tablet, a personal computers (PC), a work station, or a video game device.

14. The computing device of claim 9, wherein the DSN includes at least one of a wireless communication system, a wire lined communication system, a non-public intranet system, a public internet system, a local area network (LAN), or a wide area network (WAN).

15. A method for execution by a computing device, the method comprising:
detecting, within a dispersed storage network (DSN), a failed memory device among a plurality of memory devices of a storage unit (SU) of a plurality of SUs that distributedly stores a set of encoded data slices (EDSs), wherein a data object is segmented into a plurality of data segments, wherein a data segment of the plurality of data segments is dispersed error encoded in accordance with dispersed error encoding parameters to produce the set of EDSs, wherein a decode threshold number of EDSs are needed to recover the data segment;

determining a DSN address range associated with at least some EDSs of the set of EDSs associated with the data object that are stored within the failed memory device among the plurality of memory devices of the SU of the plurality of SUs; and transmitting, via an interface configured to interface and communicate with the DSN, the DSN address range to another computing device within the DSN to instruct restriction within the DSN of a memory access request associated with the at least some EDSs associated with the data object that are stored within the failed memory device among the plurality of memory devices of the SU of the plurality of SUs.

16. The method of claim 15, wherein the memory access request includes at least one of:
a user identifier (ID), a data object name, a priority indicator, a security indicator, a performance indicator, access requirements, metadata, or an access command.

17. The method of claim 16, wherein, when the memory access request includes the access command, the access command includes at least one of:
a store command, a retrieve command, a delete command, or a list command.

18. The method of claim 15 further comprising:
determining the DSN address range associated with the at least some EDSs of the set of EDSs associated with the data object that are stored within the failed memory device among the plurality of memory devices of the SU of the plurality of SUs based on at least one of a data object name, a user identifier (ID), a vault lookup, a virtual DSN address to physical location table lookup, a source name determination, a slice name determination, a predetermination, a message, a command, or a virtual DSN address to physical location table lookup utilizing a plurality of slice names as an index.

19. The method of claim 15 further comprising:
servicing the DSN of memory access request based on at least one of the decode threshold number of EDSs, a read threshold number of EDSs, or a write threshold number of EDSs of the set of EDSs from other SUs of the plurality of SUs excluding the failed memory device among the plurality of memory devices of the SU of the plurality of SUs, wherein the read threshold number of EDSs provides for reconstruction of the data segment, and wherein the write threshold number of EDSs provides for a successful transfer of the set of EDSs from a first at least one location in the DSN to a second at least one location in the DSN.

20. The method of claim 15, wherein the DSN includes at least one of a wireless communication system, a wire lined communication system, a non-public intranet system, a public internet system, a local area network (LAN), or a wide area network (WAN).

\* \* \* \* \*